United States Patent [19]

Hall, III et al.

[11] Patent Number: 5,234,278
[45] Date of Patent: Aug. 10, 1993

[54] DRIVE CONNECTION FOR AN ENGINE AND TRANSMISSION

[75] Inventors: Arthur Hall, III, Cicero; Richard L. Wagner, Danville, both of Ind.

[73] Assignee: General Motors Corporation, Detroit, Mich.

[21] Appl. No.: 723,985

[22] Filed: Jul. 1, 1991

[51] Int. Cl.⁵ .............................. B60K 23/00
[52] U.S. Cl. .......................... 403/359; 403/315; 403/326
[58] Field of Search ............... 403/359, 326, 315, 316, 403/348, 349, 377; 192/3.29, 3.28, 3.21

[56] References Cited

U.S. PATENT DOCUMENTS

| | | | |
|---|---|---|---|
| 1,978,186 | 10/1934 | Buchanan | 403/349 X |
| 2,800,800 | 7/1957 | Dunn | 403/359 X |
| 3,396,554 | 8/1968 | Westercamp | 403/359 X |
| 4,502,279 | 3/1985 | Fuehrer | 403/359 X |
| 4,756,638 | 7/1988 | Neyret | 403/349 X |
| 5,129,493 | 7/1992 | Edmunds | 192/3.29 |

Primary Examiner—Randolph A. Reese
Assistant Examiner—Anthony Knight
Attorney, Agent, or Firm—Donald F. Scherer

[57] ABSTRACT

A drive connection between an engine and transmission has an internally splined flywheel drivingly connected to the engine and an externally splined driven member connected to the transmission and engaging the flywheel spline. A retainer ring includes a tab member which is disposed in a slot in the flywheel to maintain the spline connection. The tab has an area which is deformable after assembly to engage a recess formed in a wall of the slot to resist relative rotation between the retainer ring and the flywheel.

4 Claims, 2 Drawing Sheets

DRIVE CONNECTION FOR AN ENGINE AND TRANSMISSION

BACKGROUND OF THE INVENTION

The invention herein described was made in the course of work under a contract or subcontract thereunder with the Department of the Army.

This invention relates to rotary drive connections, and more particularly, to rotary spline drive connections between an engine and a transmission. A specific environment for the present invention is in the spline drive connection between the engine flywheel and the torque converter input shell.

The spline drives have been found to be the most efficient method of engine/transmission connection. These connections provide ease of assembly and low manufacturing cost while restricting axial movement. However, some relative axial movement under load, can produce considerable wear on the splines.

One solution to alleviate wear is a bolted or threaded fastener connection between the engine and transmission. However, these connections generally result in axial compression loading of the crankshaft when the torque converter expands axially due to internal pressure.

SUMMARY OF THE INVENTION

The present invention incorporates a spline drive and also controls preloading of the engine crankshaft such that during expansion of the torque converter, the preload is relieved and excess compressive loading is not imposed on the crankshaft. The present invention also restricts the relative axial movement between the spline members of the drive connection.

It is therefore an object of this invention to provide an improved spline drive connection between an engine and a transmission.

It is another object of this invention to provide an improved rotary splined drive connection, wherein the splined members are secured from relative axial displacement by a retainer ring which is urged by one of the spline members into axial abutment with the other spline member.

A further object of this invention is to provide an improved rotary splined drive connection in a powertrain drive system, wherein one splined member has a slot and ramp structure which cooperates with tabs on a retaining ring which is disposed to abut the other spline member thereby inhibiting relative axial displacement of the splined members and further wherein, a flex plate is secured to one of the spline members to accommodate fore and aft displacement of the splined connection.

These and other objects and advantages of the present invention will be more readily apparent from the following specification and drawings.

DESCRIPTION OF THE EXEMPLARY EMBODIMENT

Figure 1:
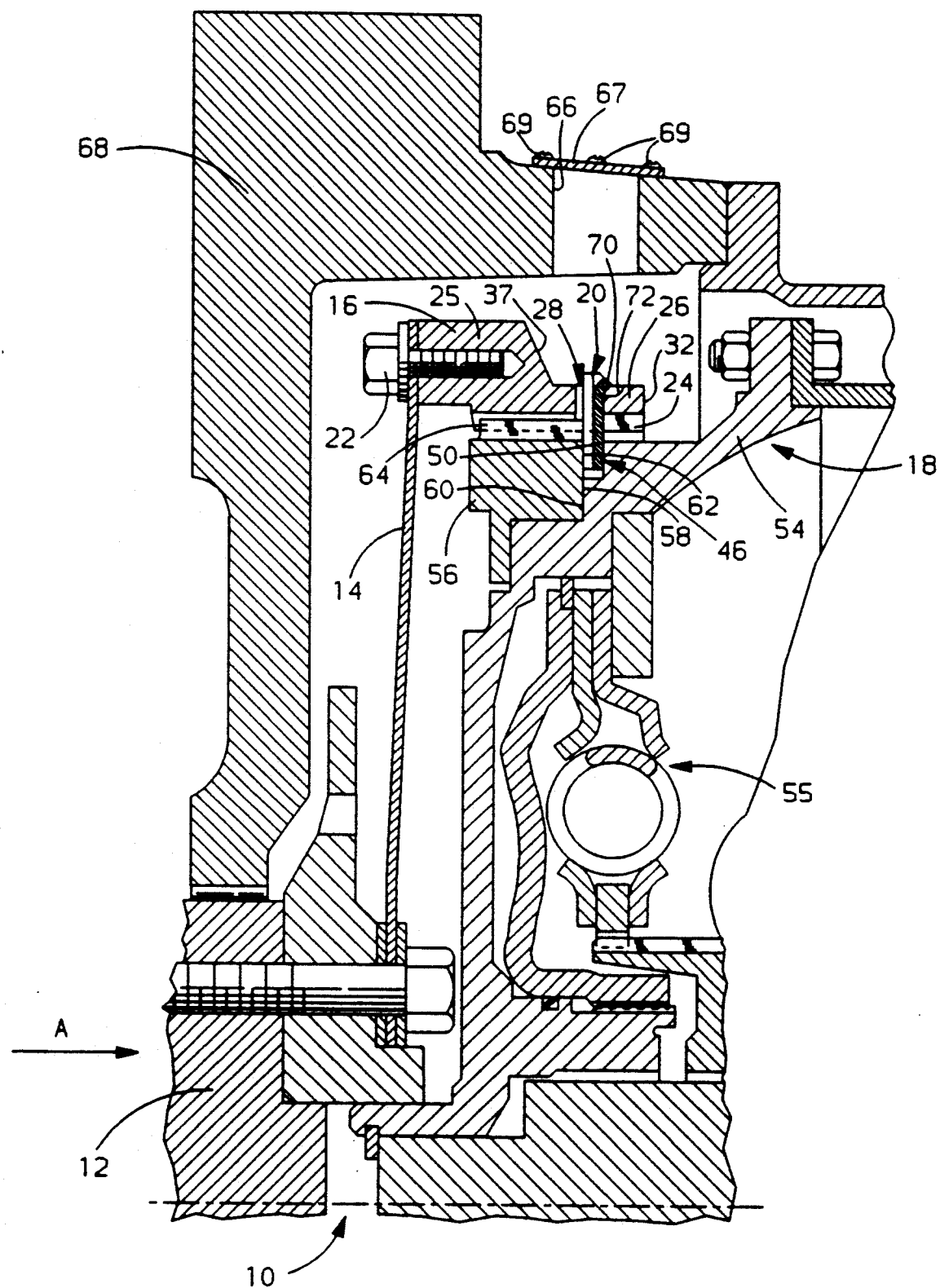
FIG. 1 is a cross-sectional elevational view of a spline connection between an engine and torque converter.

Referring to the drawings, wherein like characters represent the same or corresponding parts throughout the several views, there is seen in FIG. 1, an engine/transmission drive connection, generally designated 10, which includes an engine crankshaft 12 to which is secured a conventional flex plate 14 and a flywheel 16. The drive connection 10 also includes a torque converter input shell 18 and a retainer ring 20. The flywheel 16 is secured to the flex plate 14 with a plurality of threaded fasteners 22.

Figure 2:
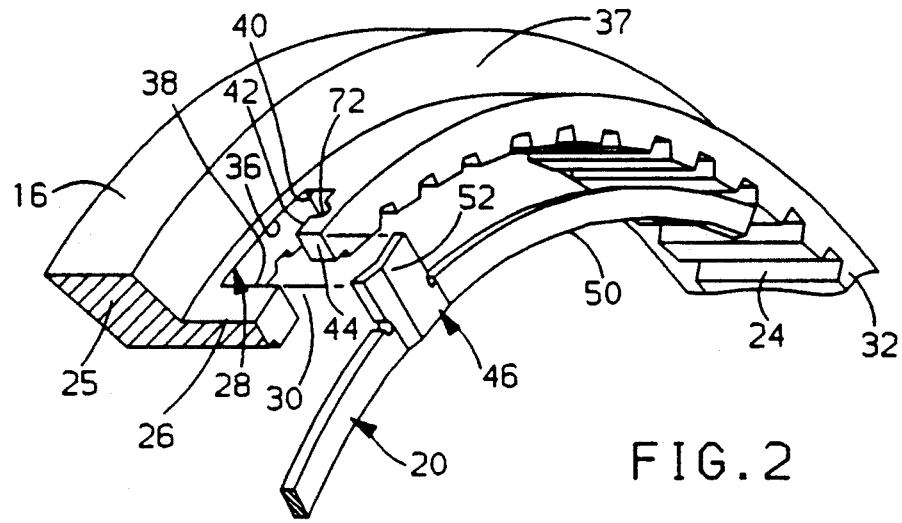
FIG. 2 is an exploded perspective view of a portion of the spline connection and a retainer ring prior to assembly.
Figure 3:
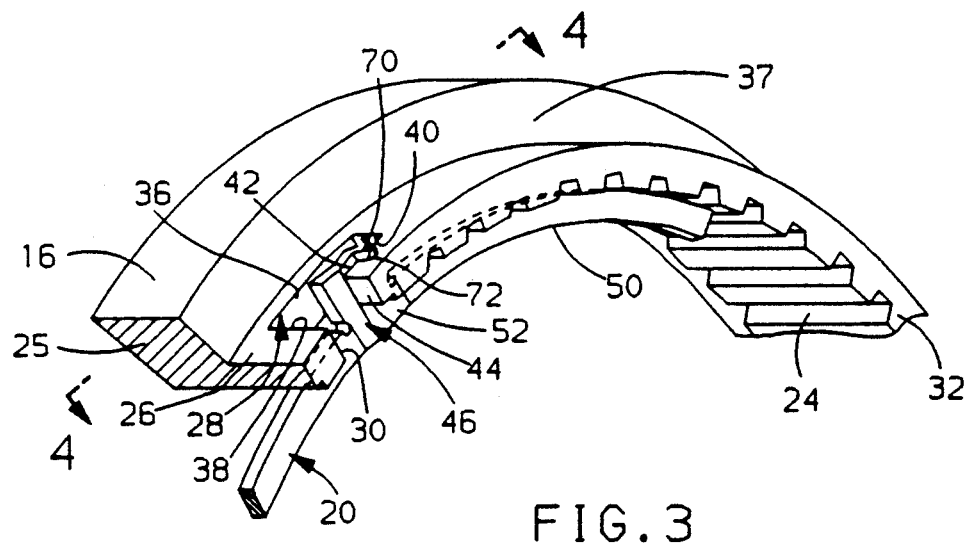
FIG. 3 is a perspective view of the retainer ring installed in the spline member.

As best seen in FIGS. 2 and 3, the flywheel 16 is essentially an annular body having an inner spline surface 24. The flywheel 16 is essentially L-shaped in cross section having a main body portion 25 and a relatively narrow annular extension 26 which is presented toward the input shell 18. The annular extension 26 has formed therein a plurality of tapered slots, such as 28, shown in FIGS. 2–4. Each slot 28 has an opening 30 formed in an end face 32 of the annular extension 26.

The slot 28 terminates in a back wall 36 formed in the annular extension 26 intermediate the face 32 and another end face 37 which is formed on the main body portion 25 of the annular flywheel 16. The slot 28 has a pair of end walls 38 and 40. The end wall 38 joins the opening 30 with the back wall 36. The end wall 40 joins the back wall 36 with a tapered or oblique wall surface 42 which, in turn, terminates at the surface 44 adjacent the slot opening 30.

Figure 4:
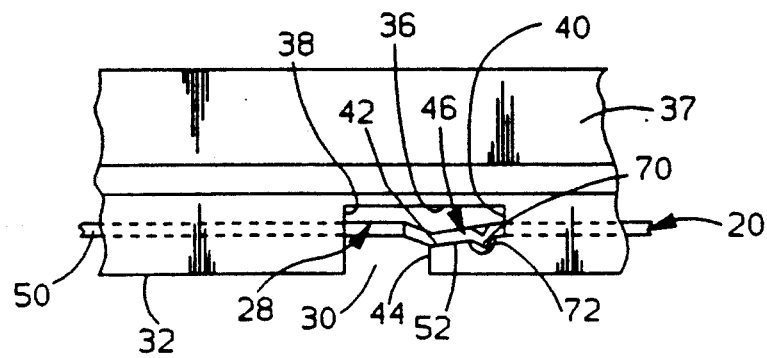
FIG. 4 is a top plan view of the spline and retainer ring shown in FIG. 3.

The tapered slots 28 are adapted to receive a tab 46 formed on the retainer ring 20. The tabs 46 extend radially outward from a main annular body 50 of the retainer ring 20. The tab 46 is formed to have a cam surface 52, which during assembly, is presented to the oblique surface 42 as shown in FIG. 4.

The input shell 18 is comprised of a housing 54 and a splined drive ring 56. The housing 54 is bolted or otherwise drive connected with a conventional torque converter impeller, not shown, and is provided with a conventional torque converter clutch, shown generally at 55. Since the torque converter impeller and torque converter clutch are conventional structures, it is not considered that a description of those members is required for an understanding of the present invention. To provide simplicity in the drawing of FIG. 1, the conventional torque converter turbine which would be disposed in parallel drive relation with the torque converter clutch 55, has been removed.

The drive ring 56 is secured to the housing 54 by a plurality of fasteners, not shown. The drive ring 56 has an end face 58 which cooperates with an annular surface 60 formed on the housing 54 to provide an annular groove 62 in which the retainer ring 20 is disposed. The tabs 46 extend outwardly from the annular groove 62 such that during assembly of the spline 64 formed on the drive ring 56 with the spline 24 on the flywheel 16, the tabs 46 will be inserted through the opening 30 into the slot 28.

An access opening 66 is provided in a transmission housing 68 so that the assembler with a simple tool, such as a screw driver or punch, can rotate the retainer ring 20 relative to the connection between the splines 64 and 24. Rotation of the retainer ring 20 will cause abutment between the cam surface 52 and the oblique surface 42 thereby urging the retainer ring to cause relative axial displacement between the drive ring 56 and the flywheel 16. The access opening 66 is closed by a cover 67 which is secured to the housing 68 by fasteners 69.

When the retainer ring 20 has been fully engaged in the slot 28, the assembler can utilize a punch to deform a portion 70 of the outer edge of the tab 46 into a recess 72 formed in the flywheel 16. The engagement between the deformed portion 70 and the recess 72 will inhibit rotation of the retainer ring 20 relative to the flywheel 16. The portion 70 and recess 72 therefore provide an effective latch mechanism to maintain the position of the retainer ring 20.

During the relative axial movement between the flywheel 16 and drive ring 56, caused by assembly of the retainer ring 20, will cause the flex plate 14 to deform slightly toward the input shell 18. This will impose the light tension load on the crankshaft 12 in the direction of Arrow A.

During operation of the engine and transmission, the internal pressure and fluid temperature with the torque converter will cause expansion or ballooning of the torque converter components such that the input shell 18 will cause the drive ring 56 and flywheel 16 to move axially in a direction opposite to Arrow A. As this movement occurs, the tension force applied to the crankshaft 12 will decrease to zero and at the extreme axial movement will result in a light compression loading of the crankshaft 12.

The range of forces from tension to compression imposed on the crankshaft 12 is not sufficient to effect the bearing structures within the engine. It should be apparent from the foregoing description that the relative axial motion between the splines 64 and 24 is eliminated after final assembly has been achieved and therefore wear between these splines which occurs in the prior art will not be present with the structure defined herein.

The embodiments of the invention in which an exclusive property or privilege is claimed are defined as follows:

1. A rotary drive transmitting connection in an engine driven transmission comprising: a flywheel having an internally splined surface, a pair of spaced annular end faces and a plurality of angularly spaced circumferentially extending slots formed thereon intermediate said end faces, each slot having a closed end, an axial facing opening into one of said end faces of circumferential extent less than said slot, and an axially extending recess formed in each slot; a drive ring having an externally splined surface disposed in mating relation with said internally splined surface and including an annular end face axially aligned with said slots radially inward of said internally splined surface; and a retainer ring having an annular body portion disposed in abutment with a portion of said annular end face of said drive ring and a plurality of radially outwardly extending tabs disposed in respective ones of said slots and each tab having latching means for engaging respective ones of the slot recesses for inhibiting relative angular displacement between said retainer ring and said flywheel.

2. A rotary drive transmitting connection structure in an engine driven transmission comprising: a flywheel having an internally splined surface, a pair of spaced annular end faces and a plurality of angularly spaced circumferentially extending slots formed thereon intermediate said end faces, each slot having a closed end, a pair of spaced sidewalls, an axial facing opening into one of said end faces of circumferential extent less than said slot, and a recess surface formed in one sidewall of each slot; a drive ring having an externally splined surface disposed in mating relation with said internally splined surface and including an annular end face axially aligned with said slots; and a retainer ring having an annular body portion disposed in abutment with a portion of said annular end face of said drive ring, and a plurality of radially outwardly extending tabs each having a circumferential extent less than the circumferential extent of said opening and being disposed in respective ones of said slots and deformable means disposed on at least one of said tabs for permitting deformation thereof during engagement with the one sidewall and for entering into an engaging relation with the respective recess surface of the slots for inhibiting relative angular displacement between said retainer ring and said flywheel.

3. A rotary drive transmitting connection structure in an engine driven transmission comprising: a flywheel having an internally splined surface, a pair of spaced annular end faces and a plurality of angularly spaced circumferentially extending slots formed thereon intermediate said end faces, each slot having a closed end, a pair of spaced sidewalls substantially extending circumferentially from the closed end, one of which is parallel with said end faces and the other of which is angled relative to said end faces, an opening into one of said end faces of circumferential extent less than said slot, and a recess formed in one sidewall of each slot; a drive ring having an externally splined surface disposed in mating relation with said internally splined surface and including an annular end face axially aligned with said slots; and a retainer ring having an annular body portion disposed axially adjacent said annular end face of said drive ring and a plurality of radially outwardly extending tabs each having a circumferential extent less than the circumferential extent of said opening and disposed in respective ones of said slots in abutment with an inner surface thereof in a manner to force said annular body portion into abutment with said annular end face of said drive ring, and each tab having latching means for engaging the respective recess of the slots for inhibiting relative angular displacement between said retainer ring and said flywheel.

4. The rotary drive transmitting connection structure defined in claim 3 further comprising: attachment means formed on said drive ring for attaching said drive ring with a torque converter; and means for attaching said flywheel with an engine.

* * * * *